(12) United States Patent
Drocco

(10) Patent No.: US 8,322,912 B2
(45) Date of Patent: Dec. 4, 2012

(54) KNEADING MACHINE FOR FOOD PRODUCTS

(75) Inventor: Davide Drocco, Roddi d'Alba (IT)

(73) Assignee: Sancassiano S.p.A., Roddi d'Alba (Cuneo) (IT)

(*) Notice: Subject to any disclaimer, the term of this patent is extended or adjusted under 35 U.S.C. 154(b) by 1094 days.

(21) Appl. No.: 12/048,755

(22) Filed: Mar. 14, 2008

(65) Prior Publication Data
US 2008/0225633 A1 Sep. 18, 2008

(30) Foreign Application Priority Data
Mar. 16, 2007 (EP) .................................. 07425148

(51) Int. Cl.
*B01F 7/00* (2006.01)
*B01F 13/02* (2006.01)

(52) U.S. Cl. .............. 366/292; 366/97; 366/91; 366/77; 366/241; 366/244; 366/279; 366/297; 220/574

(58) Field of Classification Search .................... 366/91, 366/97, 77, 241, 244, 279, 292, 297; 220/574
See application file for complete search history.

(56) References Cited

U.S. PATENT DOCUMENTS

| 4,010,932 A * | 3/1977 | Otto ................................ 366/70 |
| 4,277,181 A * | 7/1981 | Stahly et al. .................... 366/69 |
| 4,311,397 A * | 1/1982 | Wright ............................. 366/98 |
| 4,375,336 A * | 3/1983 | Halley ............................. 366/77 |
| 7,866,877 B2 * | 1/2011 | Fay et al. ........................ 366/99 |

FOREIGN PATENT DOCUMENTS

| EP | 1550499 A2 * | 7/2005 |
| FR | 382856 A * | 2/1908 |

* cited by examiner

*Primary Examiner* — Nathan Bowers
(74) *Attorney, Agent, or Firm* — Heslin Rothenberg Farley & Mesiti P.C.; Victor A. Cardona, Esq.

(57) ABSTRACT

A machine for the production of dough mixes for foodstuffs includes a fixed tank and at least two kneading implements with fixed axes of rotation.

18 Claims, 22 Drawing Sheets

Sez C-C

KNEADING MACHINE FOR FOOD PRODUCTS

CROSS-REFERENCE TO RELATED APPLICATIONS

This application claims priority from European Patent application No. 07425148.9, filed on Mar. 16, 2007, the entire disclosure of which is incorporated herein by reference.

BACKGROUND OF THE INVENTION

The present invention relates to a machine for the production of dough mixes, in particular dough mixes for foodstuffs.

There are known in the technical field kneading machines for the production of dough in batches, of the type for example illustrated in the European patent application No. EP-A-1676629, filed in the name of the present applicant. The solution described in this application envisages a planetary kneading machine comprising: a tank; one or more kneading implements that can turn about the respective vertical axes, which are set at a distance from a central vertical shaft; a planetary structure for supporting the kneading implements, on which each kneading implement is mounted so that it can turn about its own axis, the planetary supporting structure being in turn mounted so that it can turn about the central shaft of the tank on a structure for supporting the machine; first means for controlling rotation of the planetary structure about the central shaft of the tank; and second means for controlling rotation of each kneading implement about its own axis. Even though kneading machines of this type are able to exert a highly efficient kneading action, they present the disadvantage of having a complex and extremely delicate structure. In fact, the planetary supporting structure that is mounted so that it can turn about the central shaft of the tank is subject to considerable stress during the kneading action and is liable to failure above all in points corresponding to the members for support and transmission of the motion.

Moreover known in the art are kneading machines for foodstuff products of the type described, for example, in the European patent application No. EP-A-1707052, filed in the name of the present applicant. This document describes a kneading machine comprising a substantially cylindrical tank that turns about an axis thereof, and at least one kneading implement that can turn within the tank, about an axis substantially parallel to the axis of the tank. A solution of this type has a structure that is more robust than that of the solution described previously, but is afflicted, however, by the problems inherent in the fact of producing a rotary tank to which it is extremely complicated to associate means for controlling the temperature that envisage a circulation of diathermic fluid about the walls of the tank itself, or else means for controlling the pressure that comprise means of air-tight sealing.

SUMMARY OF THE INVENTION

The present invention proposes a solution to the problems and disadvantages presented by the machines according to the known art by providing a machine for the production of dough mixes, in particular of dough mixes for foodstuffs, presenting the characteristics of Claim 1.

BRIEF DESCRIPTION OF THE DRAWINGS

Further characteristics and advantages will emerge clearly from the attached plate of drawings, which are provided purely by way of non-limiting example and in which.

DETAILED DESCRIPTION OF THE INVENTION

Figure 1:
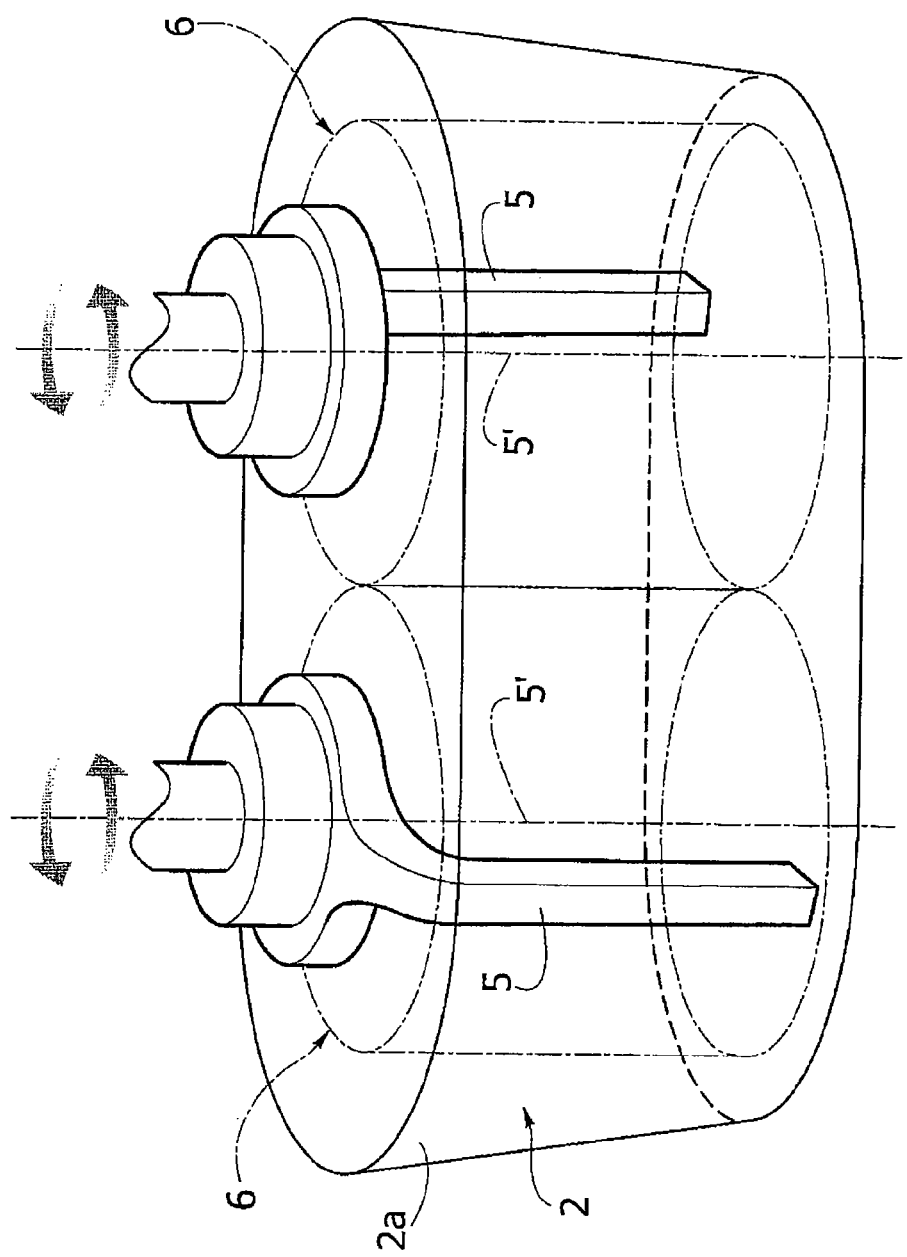
FIG. 1 is a schematic perspective view of the machine according to the invention.
Figure 16:
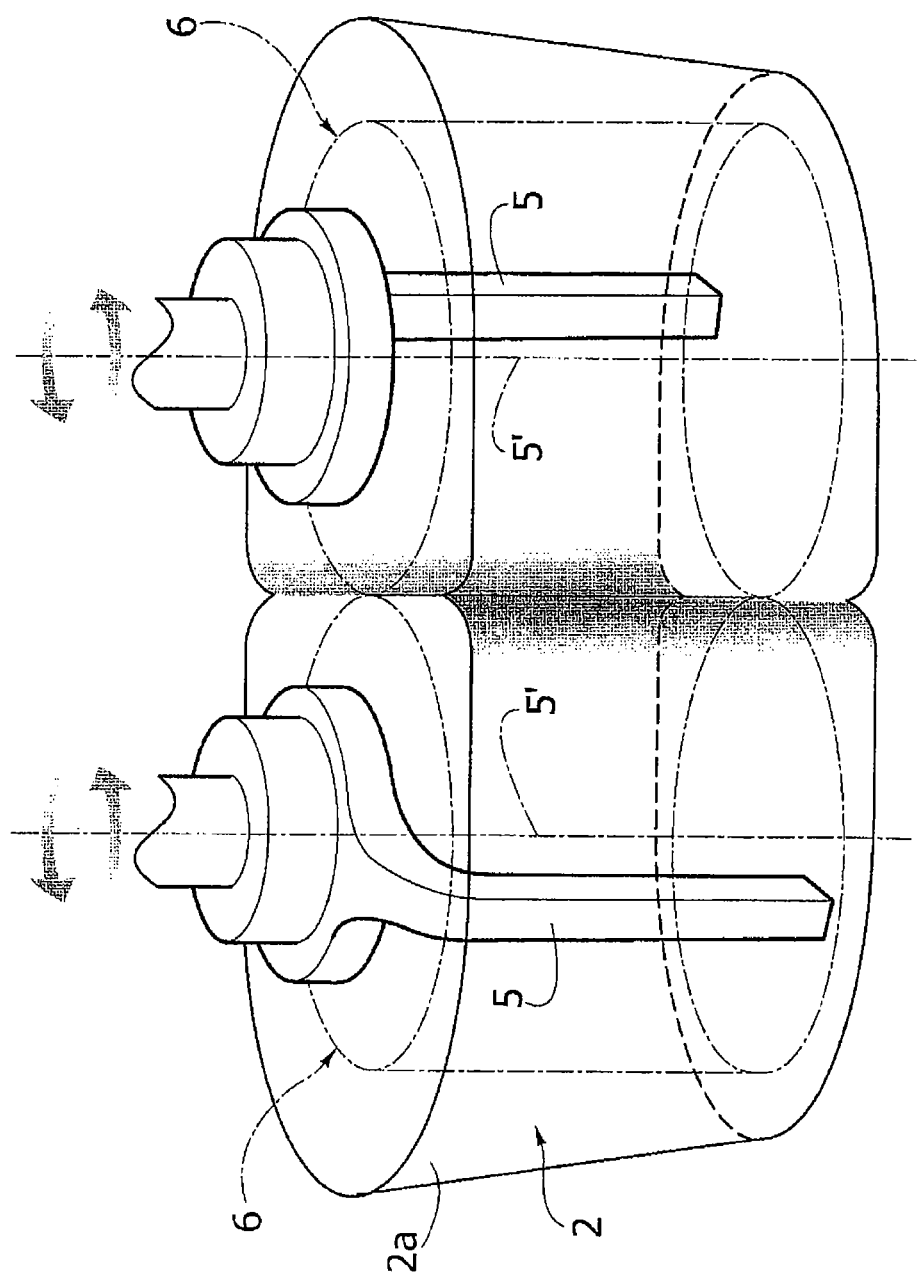
FIG. 16 is a schematic perspective view of a further embodiment of the machine according to the invention.
Figure 17:
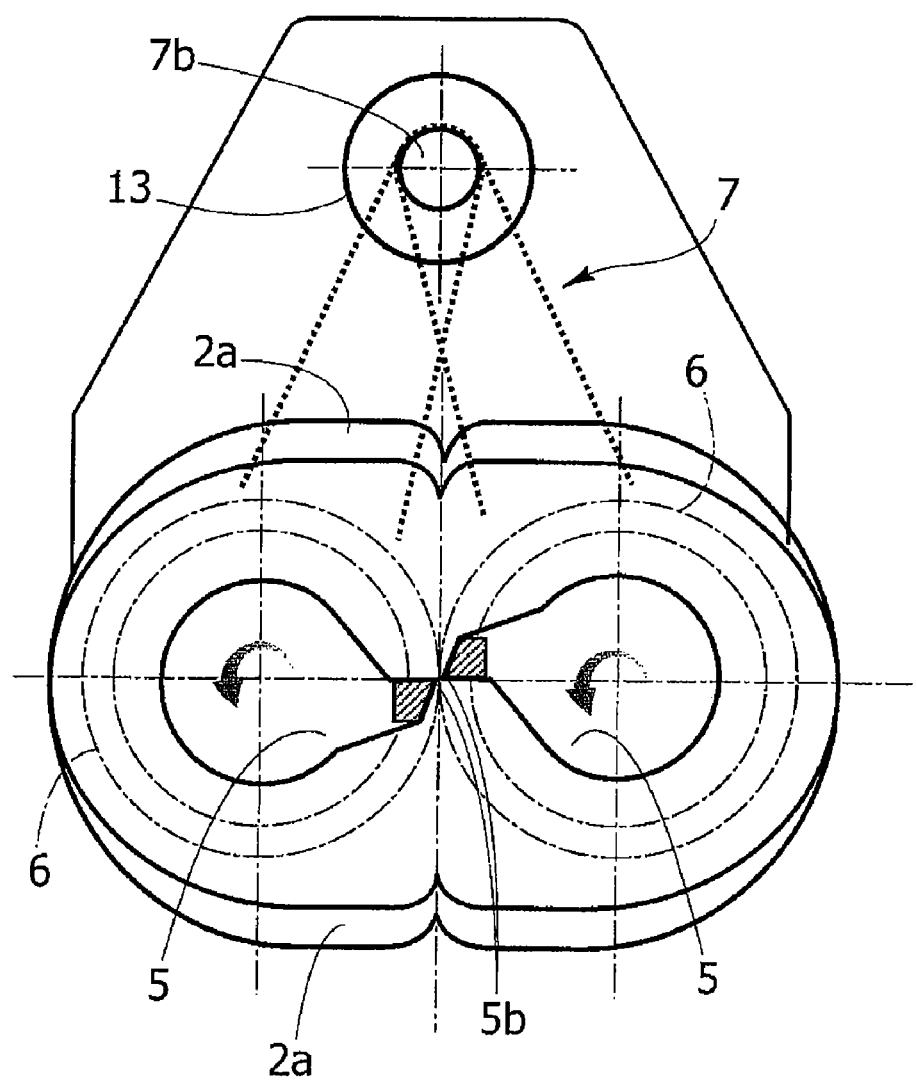
FIG. 17 is a plan view of the machine according to the embodiment of FIG. 16.

FIG. 1 is a schematic perspective view of a kneading machine according to the invention. It comprises a fixed tank 2 and two kneading implements 5 with fixed axis of rotation 5'. The kneading implements 5 define with their rotation respective theoretical cylinders of revolution 6, which, as may be seen in FIG. 1, are substantially tangential to one another. The tank 2 and the kneading implements 5 have dimensions such that the theoretical cylinders of revolution 6 occupy a substantial portion of free volume of the fixed tank 2. In fact, since the tank 2 is fixed and the kneading implements 5 have respective axes of rotation 5' that are also fixed, the kneading implements 5 are prearranged for acting during their rotation on all the dough contained within the fixed tank 2. In FIGS. 16 and 17, the fixed tank 2 has a shape in plan view substantially like a figure eight, which reproduces the general contour of the set of the two kneading implements 5.

In particular, the tank 2 has peripheral walls 2a that develop substantially adherent to the theoretical cylinders of revolution 6. As may be seen in FIG. 4, the opposed peripheral walls 2a' that extend in the longitudinal direction of the tank 2 are respectively inclined by an angle P with respect to the vertical according to a path diverging upwards starting from the bottom of the tank so that they are substantially tangential to the theoretical cylinders of revolution 6 in their bottom region, and provided between these and the theoretical cylinders 6 is, instead, a space that increases as the distance from the bottom of the tank 2 increases.

This particular configuration of the fixed tank 2 derives from the fact that the present applicant has noted that when a peripheral wall of the tank diverges from a side facing thereto of one of the theoretical volumes of revolution, the space thus obtained between this latter and the peripheral wall is able to favour a more effective mixing of the dough. In fact, in said space the dough can turn over so as to generate a substantial flow of recirculation which increases the quality of the dough product.

In particular, with reference to the embodiments of FIGS. 1 to 12 and of FIGS. 15 to 18, it is found that an inclination of the walls 2a' by an angle P comprised between approximately 0° and 45° generates an optimal action of recirculation and mixing of the dough.

Figure 18:
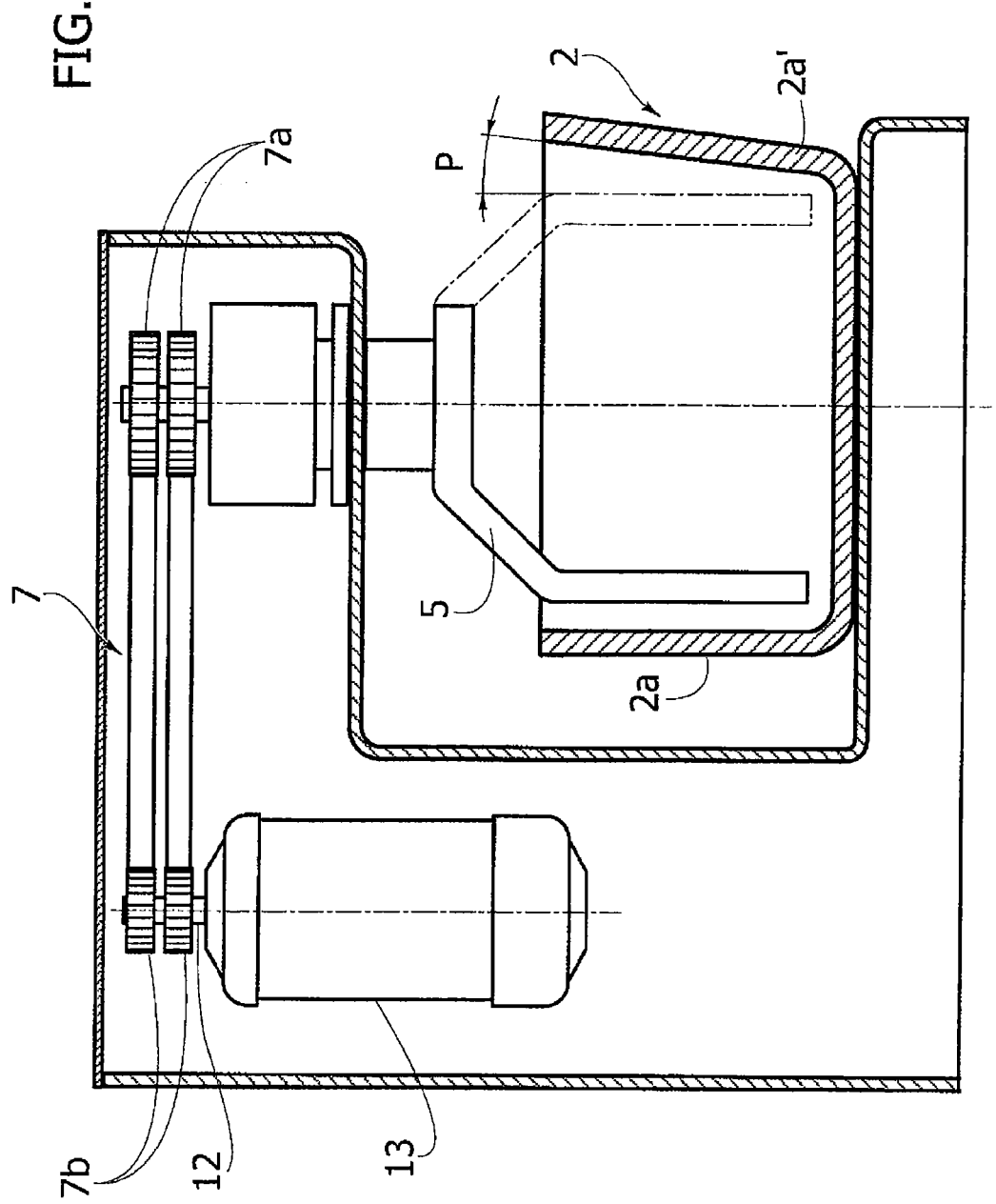
FIG. 18 is a cross-sectional side view of a further embodiment of the machine according to the invention.
Figure 19:
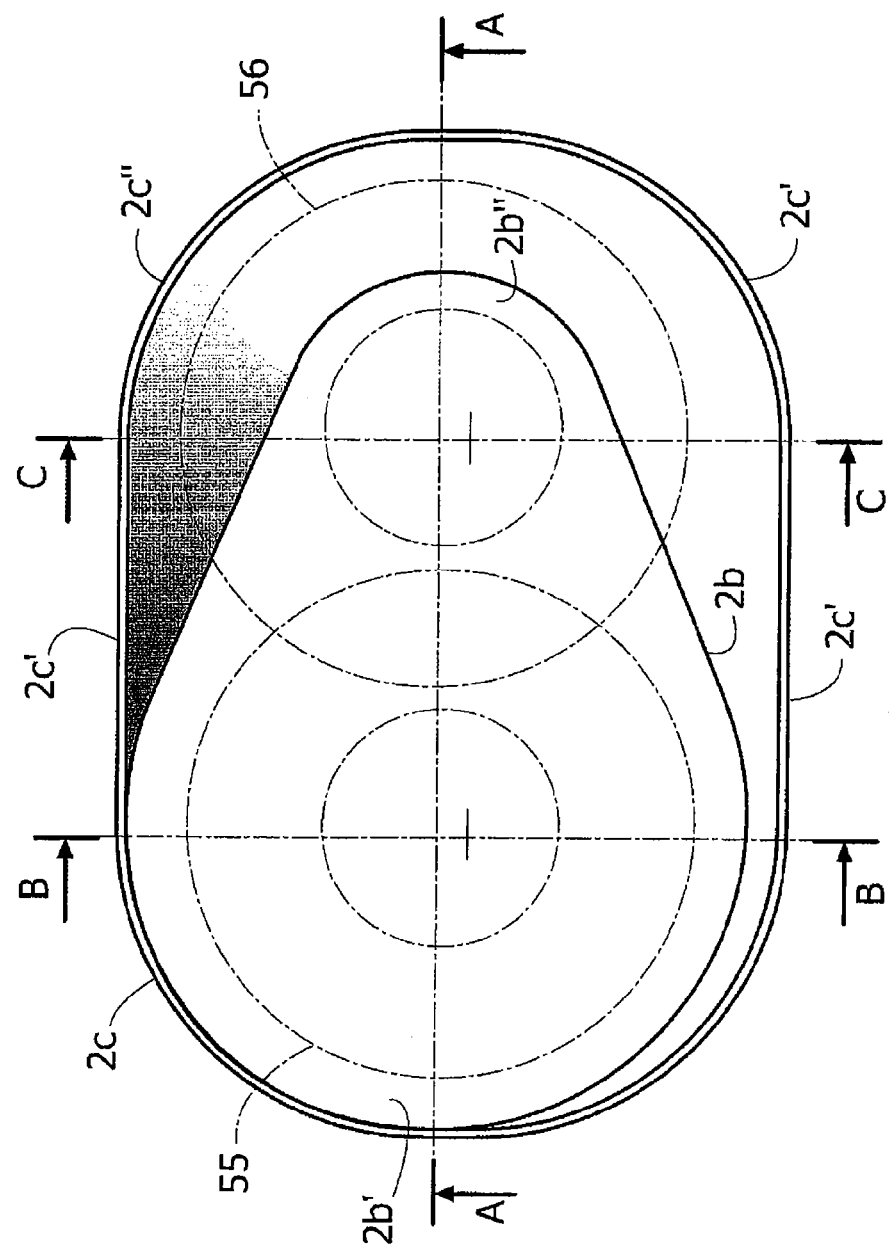
FIG. 19 is a plan view of a further embodiment of the machine according to the invention.

Moreover, in the particular embodiment of FIG. 18 it is provided that a diverging peripheral wall 2a' extends along one longitudinal side of the tank 2, while the peripheral wall 2a extending along the other opposite longitudinal side is vertical. In this embodiment, whenever the dough product is brought by the kneading tool to the side of the vertical wall 2a, it is squeezed and stretched against this latter by the arm of the kneading tool, and whenever it is brought to the side of the diverging wall 2a' it is temporarily released and taken again by the kneading tool thus being subjected to a mixing action. A cyclic kneading process is therefore established which improves the quality of the dough product and at the same time provides for short operation times.

FIGS. 19 to 22 show an alternative embodiment according to the invention wherein similarly to the previous described embodiments peripheral walls of the tank diverge from respective sides facing thereto of adjacent theoretical volumes.

Figure 20:
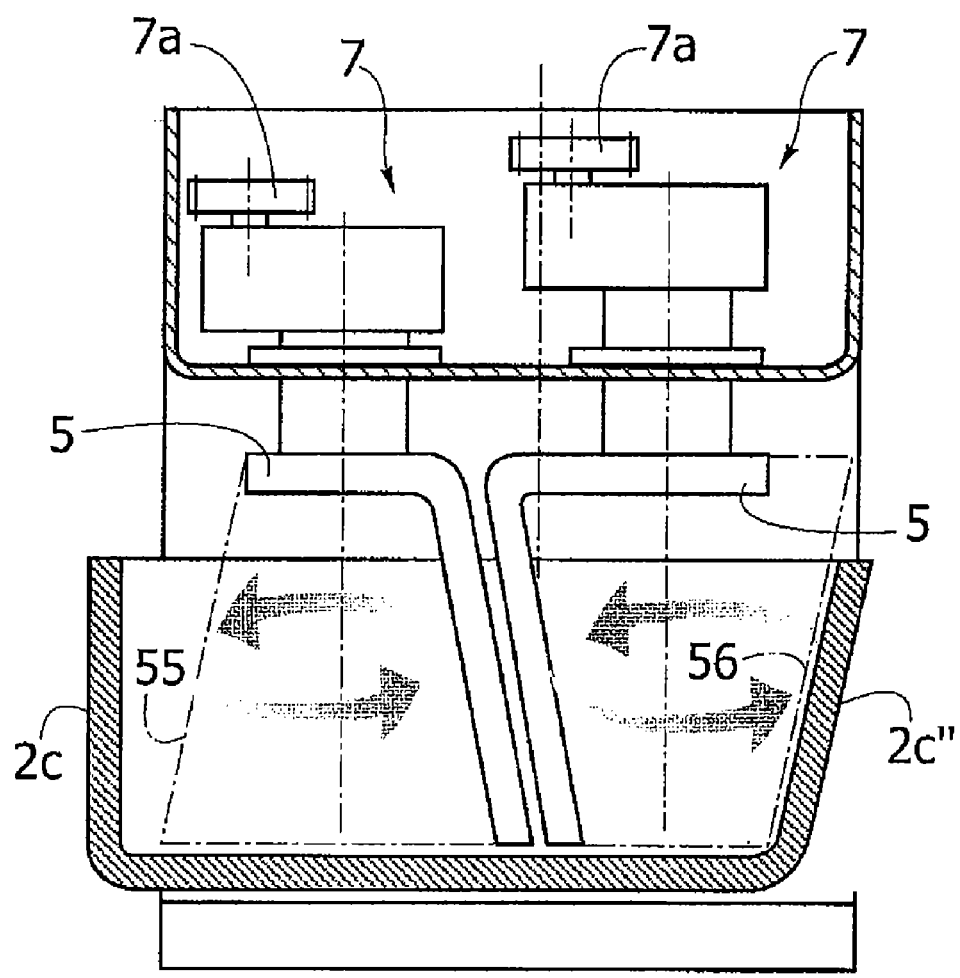
FIG. 20 shows a cross-section along section line A-A of FIG. 19.

In this embodiment the kneading tools 5 define frusto-conic shaped theoretical volumes of revolution having sides which are inclined with respect to the vertical. In particular, as shown in FIG. 20, said kneading tools 5 comprise respective arms with the same inclination with respect to the vertical, so as to define by rotation respectively a frusto-conic shaped theoretical volume 55 and an upside-down frusto-conic shaped theoretical volume 56, which are substantially tangential to each other. As will be described hereinbelow, the tangency of said volumes makes the two kneading implements susceptible to co-operate so as to exert a shearing action on the dough, which improves the quality of the kneaded product.

The tank in the embodiment of FIGS. 19 to 22 has an oval-shaped bottom 2b whose bigger end is formed by a semi-circumferential portion 2b'. A vertical peripheral wall 2c extends substantially through half of the contour of said semi-circumferential portion 2b'. Following the vertical wall 2c, by moving anti-clockwise around the contour of the oval-shaped bottom 2b, peripheral wall 2c extends which is variably inclined with respect to the vertical such that its inclination gradually increases, along said contour, up to a maximum at the smaller end 2b" of the oval-shaped bottom 2b, from where its inclination gradually decreases until a peripheral wall 2c" of constant inclination is reached, which extends substantially for the second half of the contour of the smaller end 2b", after which finally a further peripheral wall 2c' extends with a gradually decreasing inclination, up to the vertical peripheral wall 2c.

As shown in FIG. 20, at the smaller end 2b" of the oval-shaped bottom 2b the peripheral wall 2c" (on the right side of the tank) has the same inclination of the facing side of the frusto-conic shaped theoretical volume 56, so that said peripheral wall does not diverge from said volume.

Figure 21:
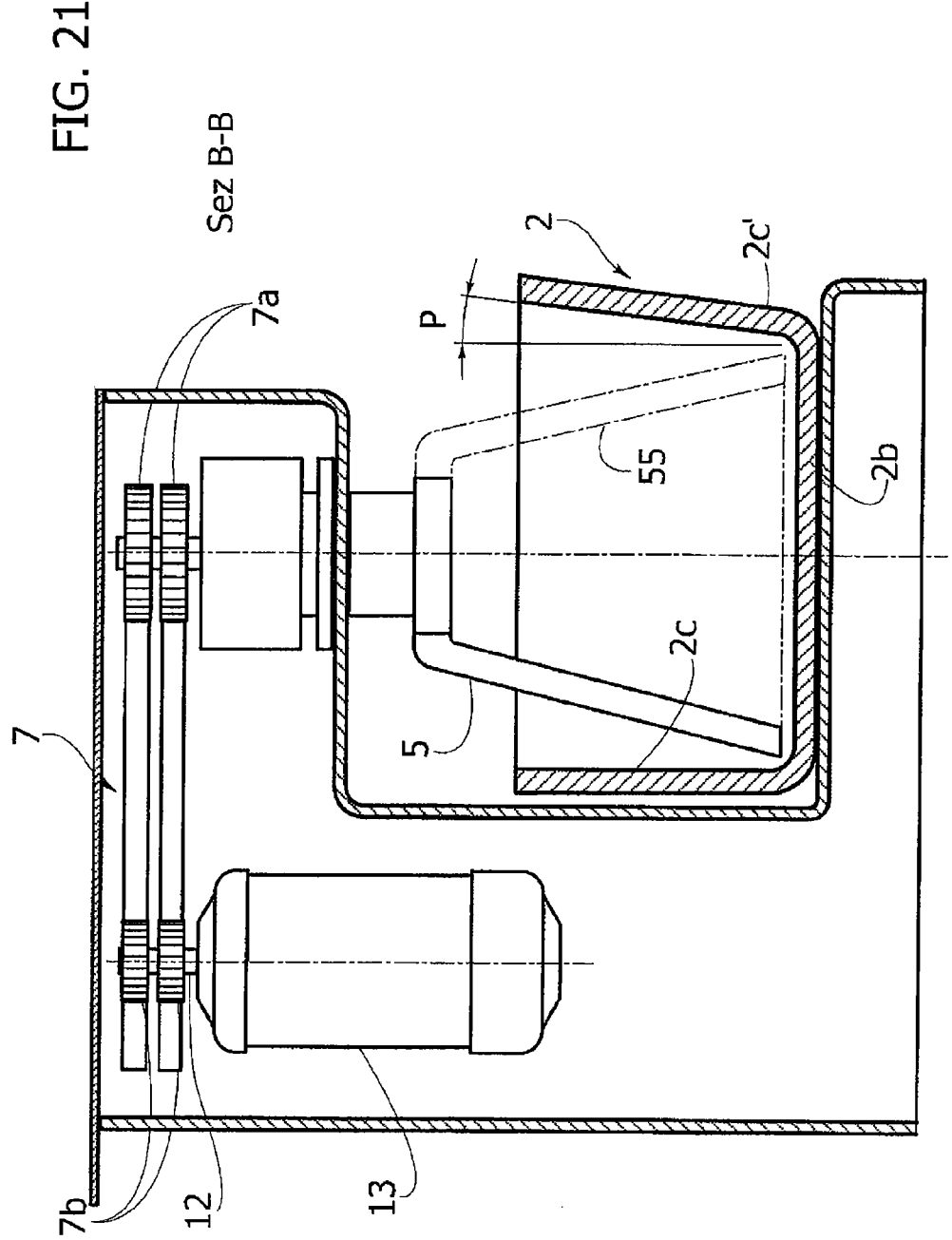
FIG. 21 shows a cross-section along section line B-B of FIG. 19.
Figure 22:
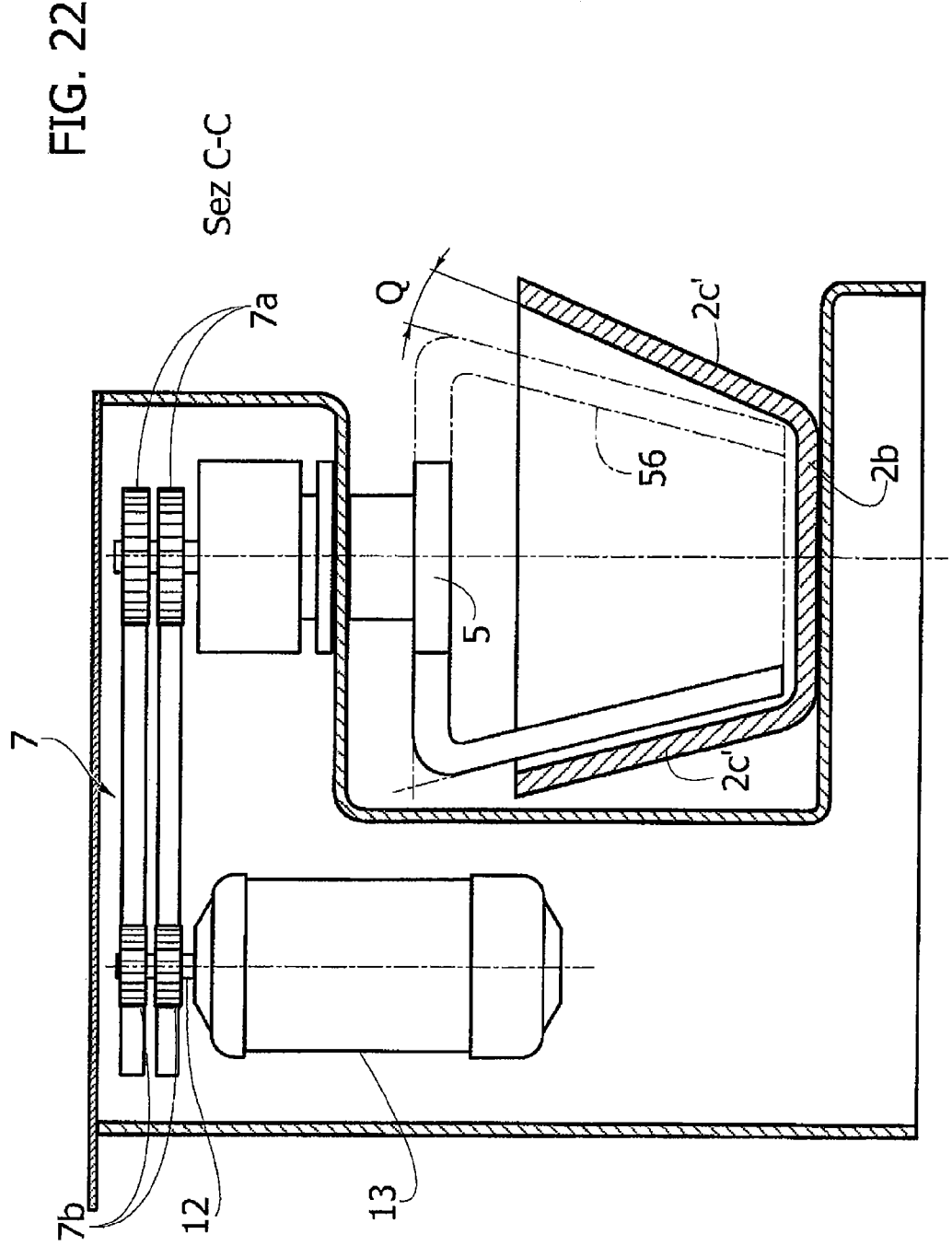
FIG. 22 shows a cross-section along section line C-C of FIG. 19.

On the contrary, divergence of peripheral walls occurs with respect to the theoretical volumes 55, 56 either, as shown in FIGS. 20 and 21, at the bigger end 2b' of the oval-shaped bottom 2b, wherein the vertical peripheral wall 2c faces the frusto-conic shaped volume 55, and, as shown in FIG. 22, at the smaller end 2b" of the oval-shaped bottom 2b, wherein the peripheral wall 2c' is inclined (by an angle Q) with respect to the side of the upside-down frusto-conic shaped volume 56 that said peripheral wall 2c' faces.

The embodiment of FIGS. 19 to 22, analogously to the embodiment of FIG. 18, provides for a cyclic treatment of the dough product according to which a squeezing and stretching action on the product is provided at the non-diverging peripheral walls, and a mixing action is otherwise provided at the diverging walls.

As shown in the embodiments above described, divergence of the peripheral walls, with respect to the sides facing thereto of the theoretical volumes which are defined by the kneading tools, can be either upwards starting from the bottom of the tank (see, for examples, FIGS. 4, 5, 9, 12, 18, 21, 22, and FIG. 20 on the left side) and downwards starting from an upper edge thereof (see FIG. 20 on the right side). In general, it is noted that the provision of theoretical cylinders of revolution 6 that as a whole occupy a volume equal to a value comprised between 45% and 80% of the free volume of the fixed tank 2 is a machine configuration that ensures very high performance of the kneading action of the machine according to the invention.

In the embodiments illustrated in FIGS. 1-9, the kneading implements 5 are each formed by an arm 5a preferably having a polygonal cross section, which has a sharp edge, forming a cutting edge, in the area of the arm facing in the direction of advance and towards the outside of the circular path followed by the arm. In the example of embodiment described herein, said sharp edge is designated by 5b.

Figure 2:
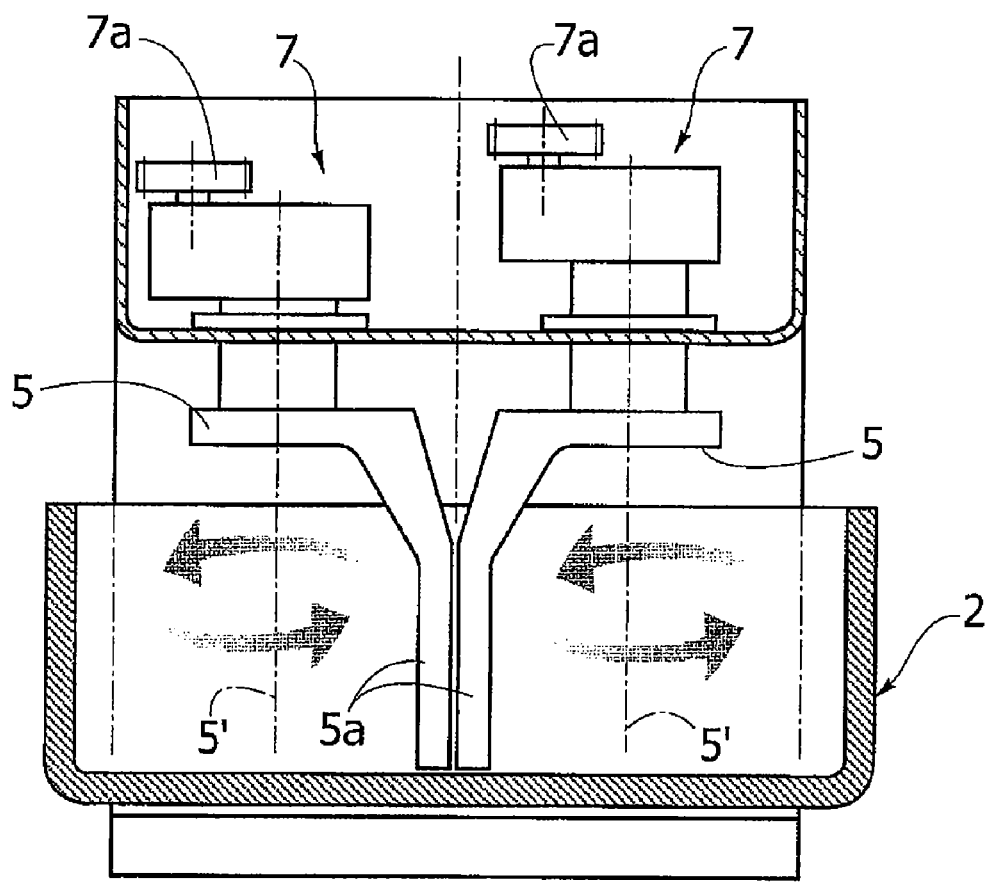
FIG. 2 is a front cross-sectional view of an embodiment of the machine according to the invention.

The arm 5a extends for a substantially rectilinear part of its length and in a direction substantially parallel to the generatrix of the theoretical cylinder of revolution 6. Alternatively, the arm of the kneading implement of the type illustrated in FIGS. 1-9 can present a rectilinear portion that extends inclined with respect to the generatrix of the theoretical cylinder of revolution 6 by an angle not sensibly greater than 10°. Present on each tank 2 are an actuation means 7, designed to control rotation of the respective kneading implements 5. As illustrated in FIGS. 2 and 4, the actuation means comprise a respective pulley 7a, connected to each kneading implement 5 via a gearcase. The pulleys 7a are connected via respective drive belts to respective pulleys 7b carried by one and the same shaft 12 of a motor 13. The kneading implements 5 thus possess a synchronized movement of rotation. Preferably, the kneading implements 5 are synchronised in such a way that the sharp edges 5b pass substantially simultaneously in the area of tangency of the respective theoretical cylinders 6, intercrossing in opposite directions of movement, on account of the concordant rotation of the two implements. In this way, at the point of tangency of the two theoretical cylinders of revolution 6 the two kneading implements 5 co-operate so as to exert a shearing action on the dough, which improves the quality of the kneaded product.

Furthermore, since the peripheral walls 2a are substantially adherent to the theoretical cylinders of revolution 6, the kneading implements 5 perform an additional action of squeezing of the dough against the aforesaid peripheral walls 2a.

Figure 3:
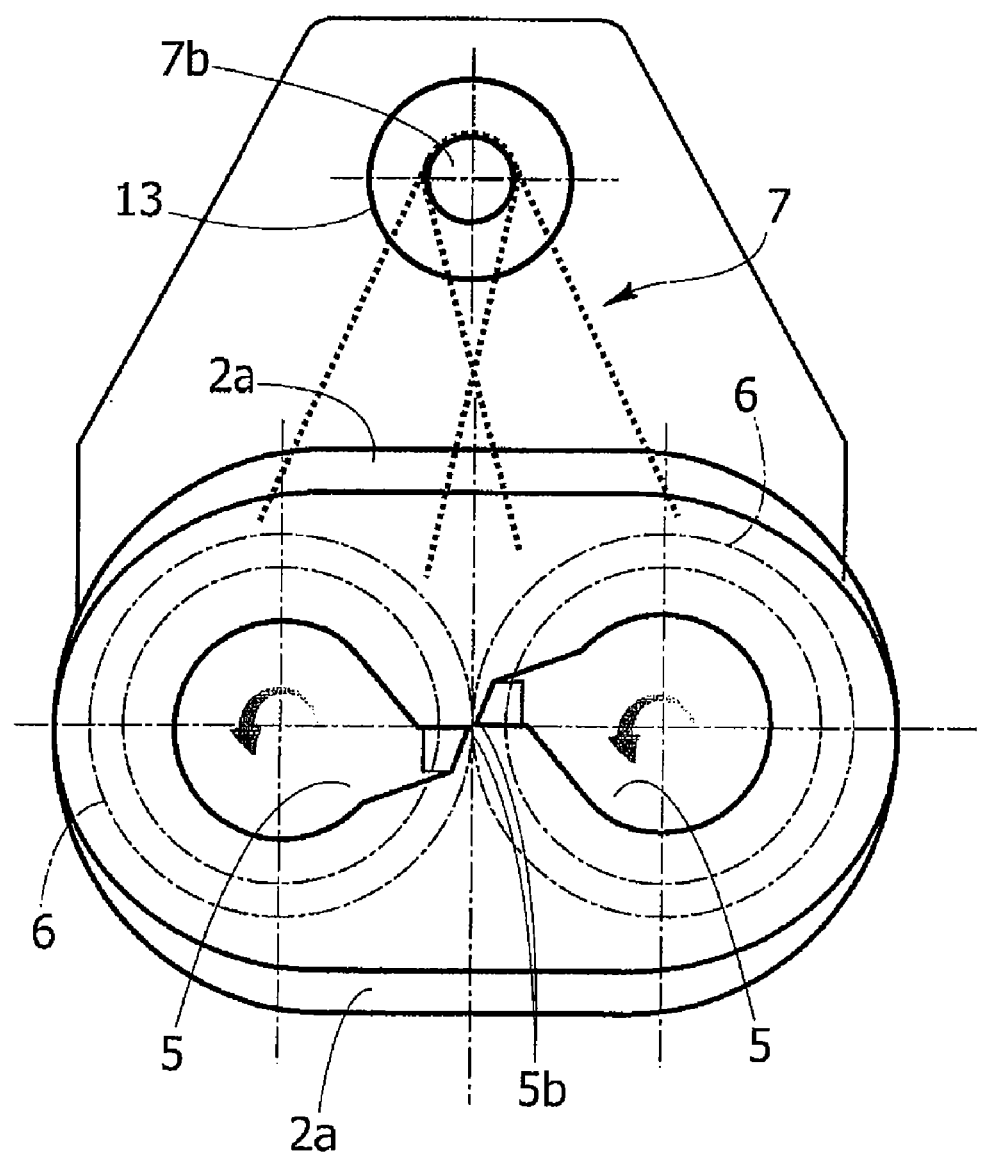
FIG. 3 is a top plan view of the machine of FIG. 2.
Figure 4:
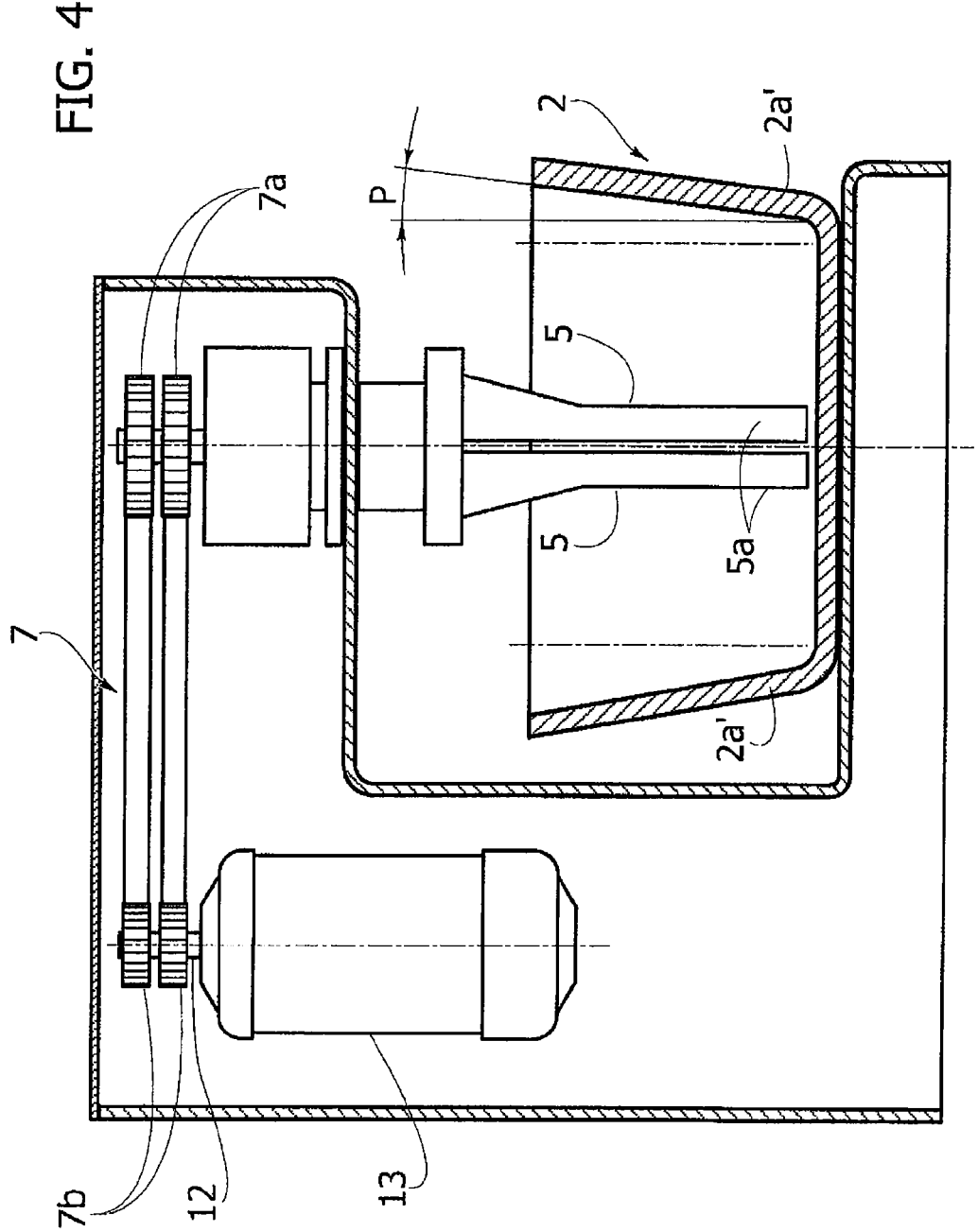
FIG. 4 is a cross-sectional side view of the machine of FIG. 3.

In the embodiment illustrated in FIGS. 2-4, the dough product is removed from the tank 2 manually or via means for picking it up of a conventional type.

Figure 5:
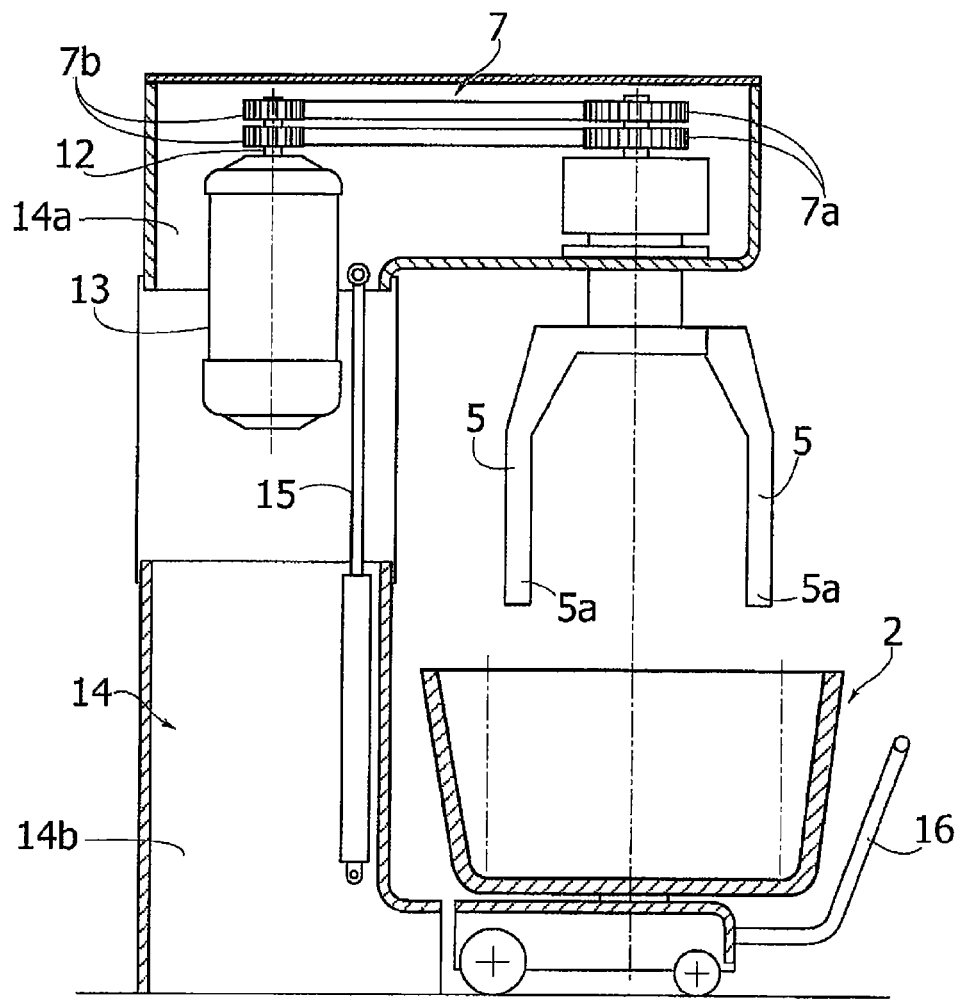
FIG. 5 is a cross-sectional side view of a further embodiment of the machine according to the invention.
Figure 6:
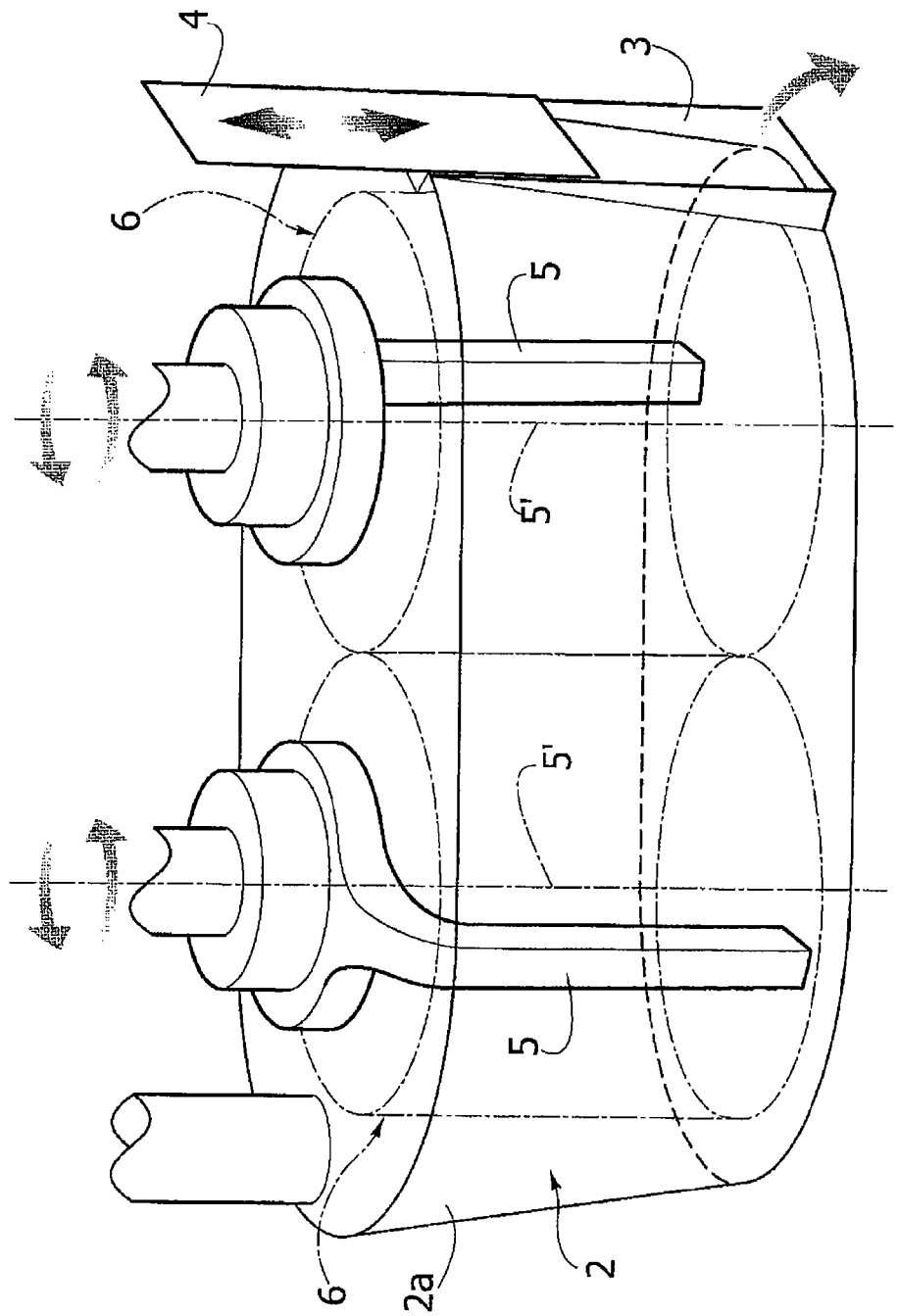
FIG. 6 is a schematic perspective view of a further embodiment of the machine according to the invention.
Figure 7:
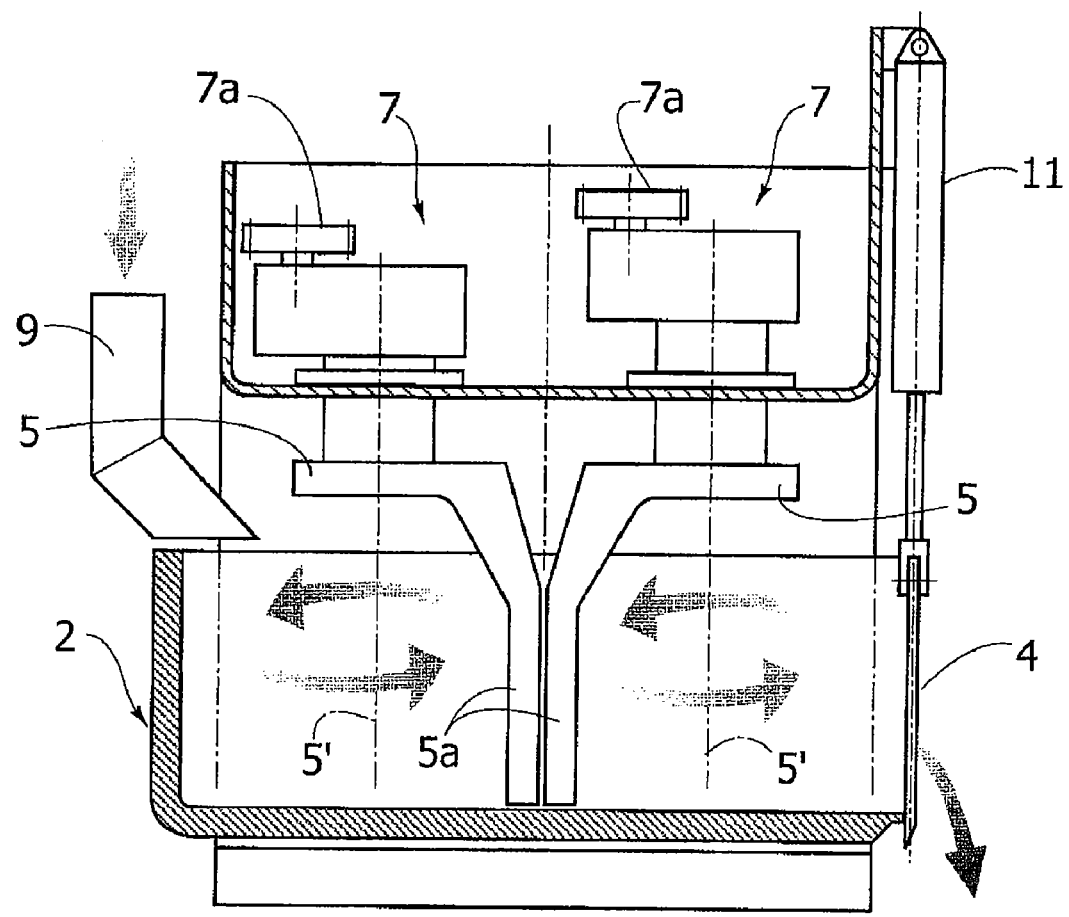
FIG. 7 is a front cross-sectional view of a further embodiment of the machine according to the invention.
Figure 8:
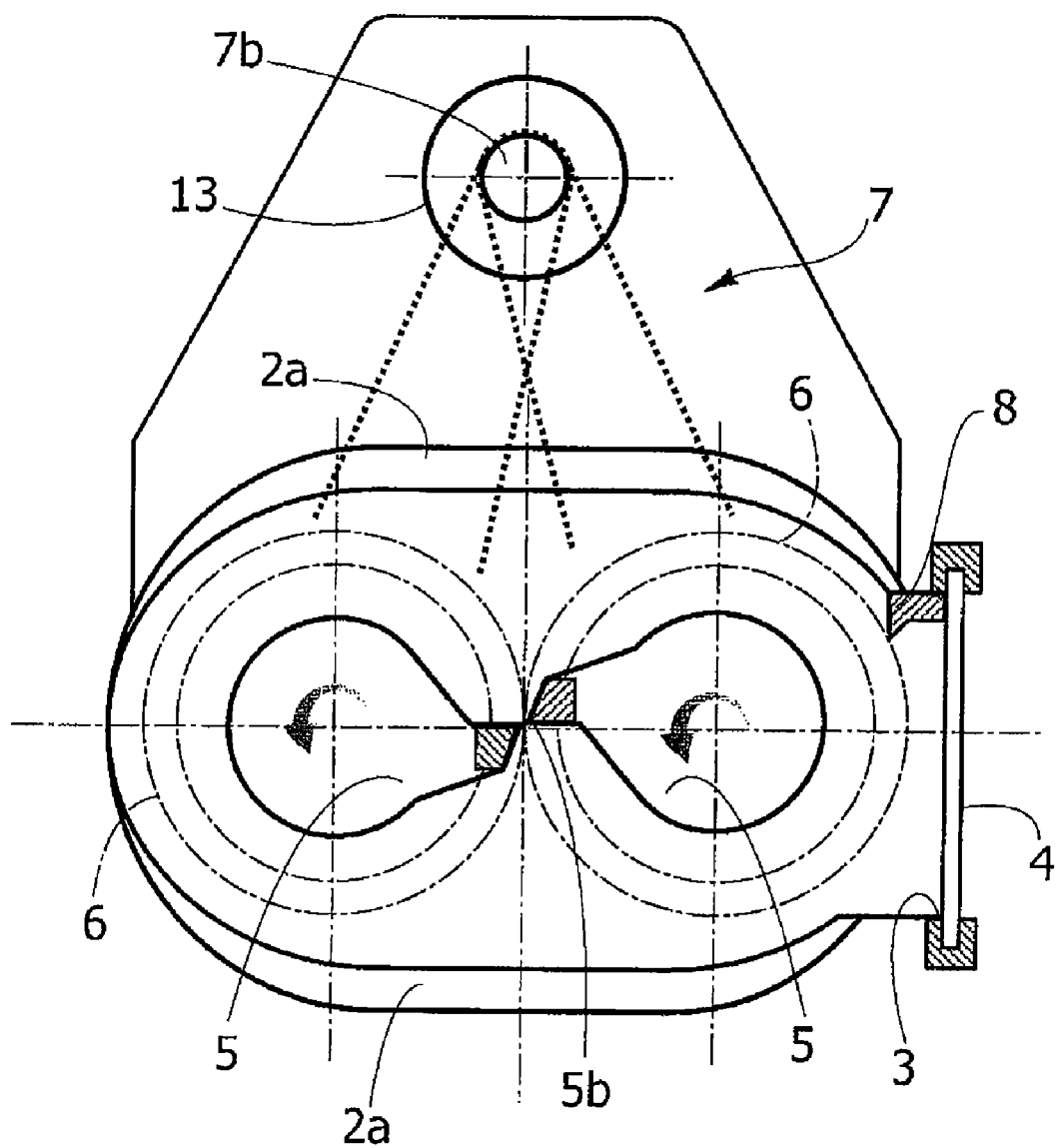
FIG. 8 is a top plan view of the machine of FIG. 7.
Figure 9:
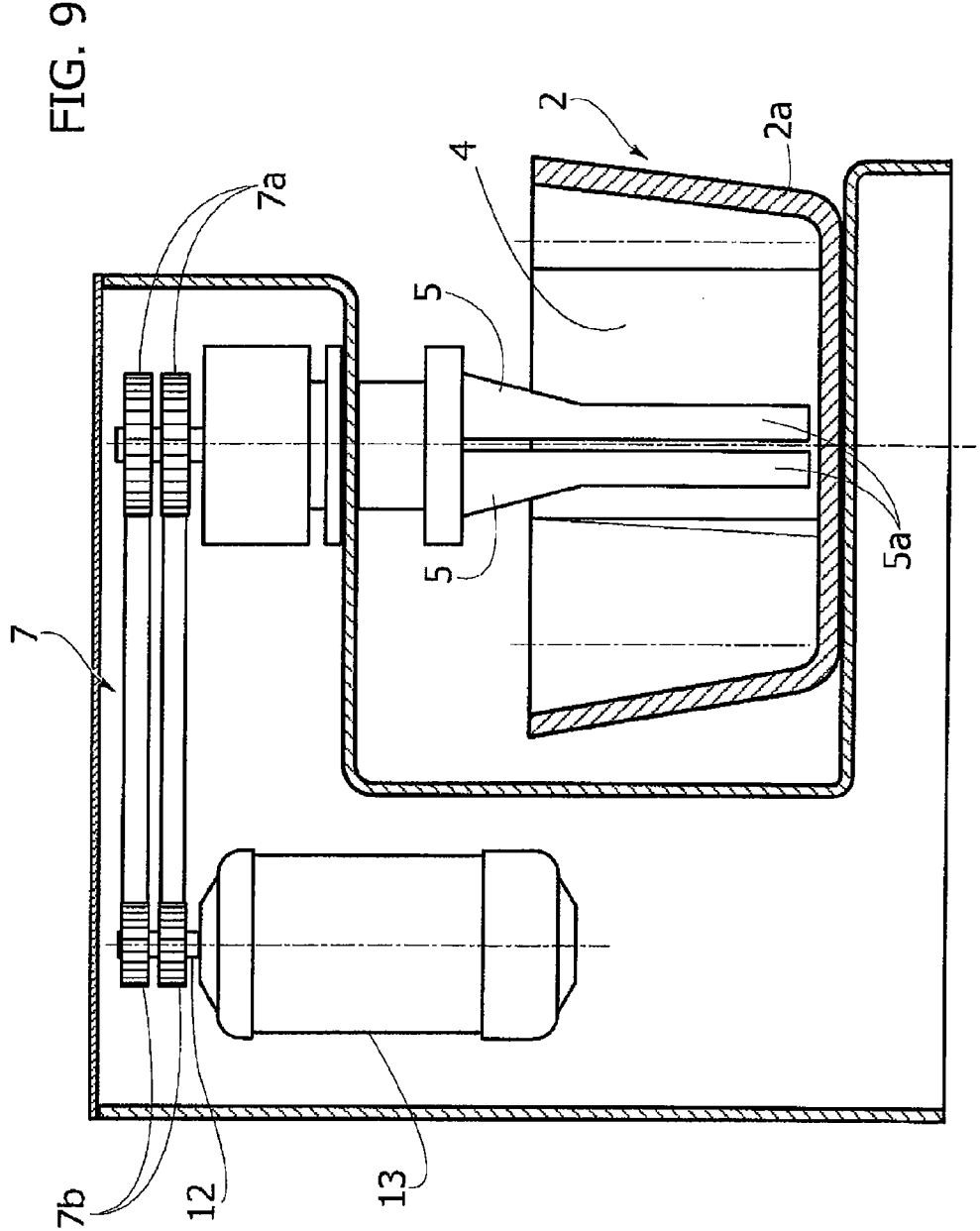
FIG. 9 is a cross-sectional side view of the machine illustrated in FIG. 7.
Figure 10:
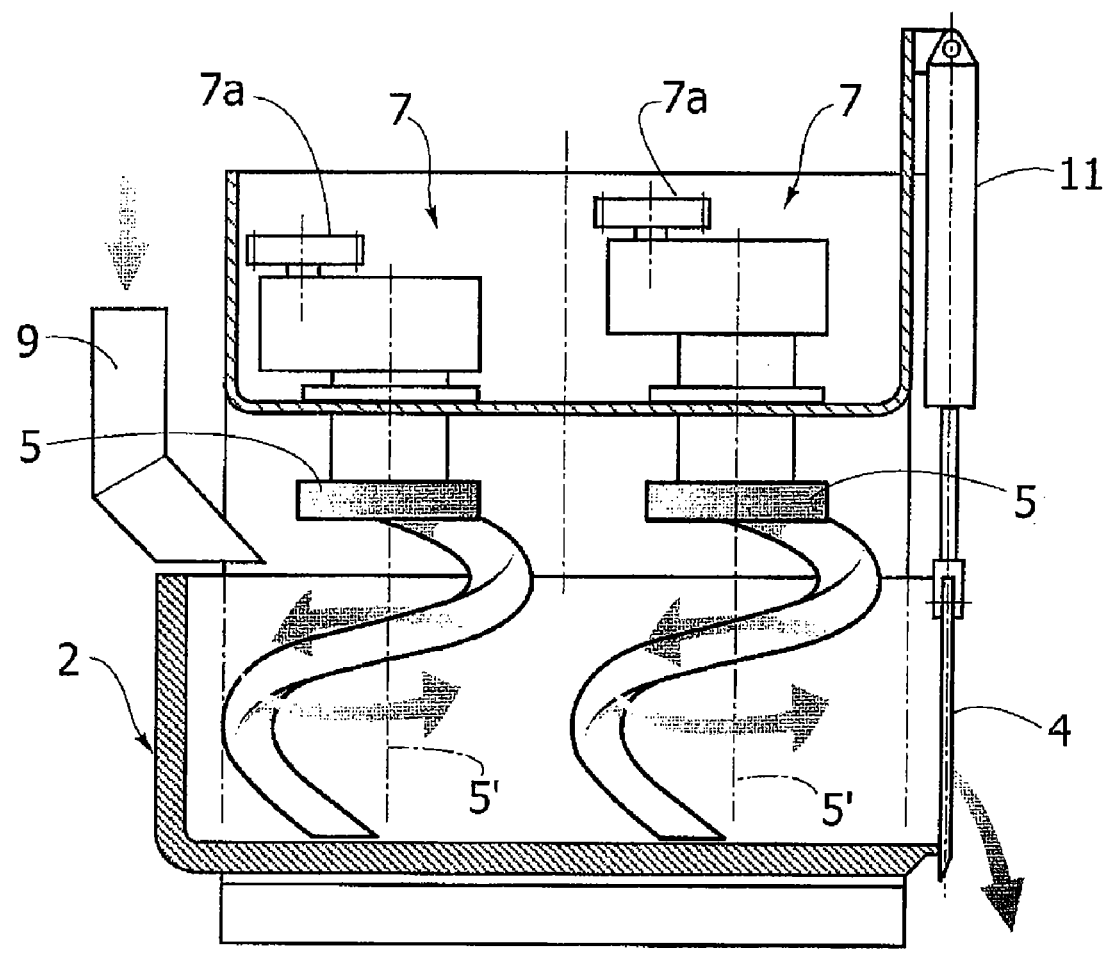
FIG. 10 is a front cross-sectional view of a further embodiment of the machine according to the invention.
Figure 11:
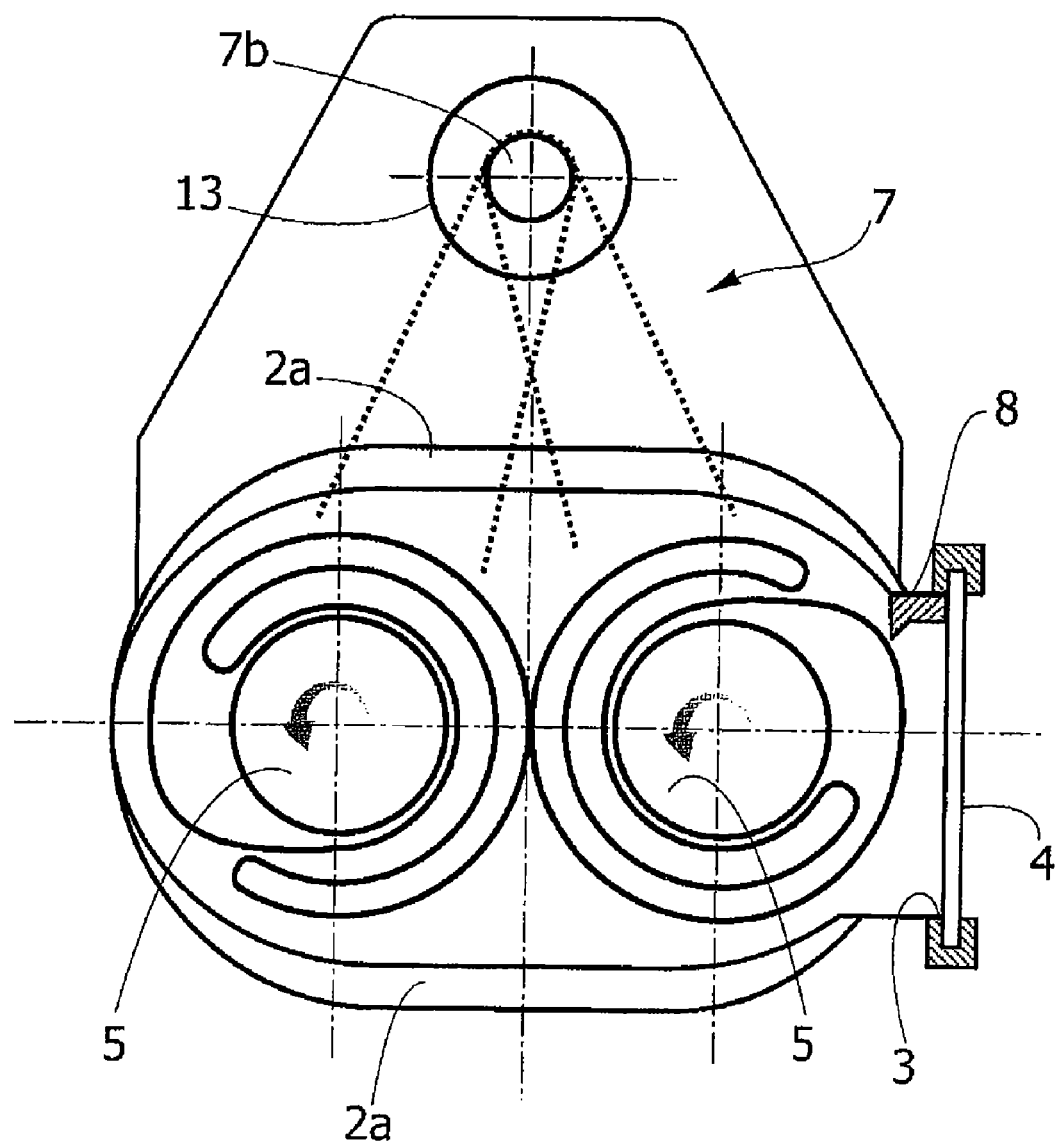
FIG. 11 is a top plan view of the machine of FIG. 10.
Figure 12:
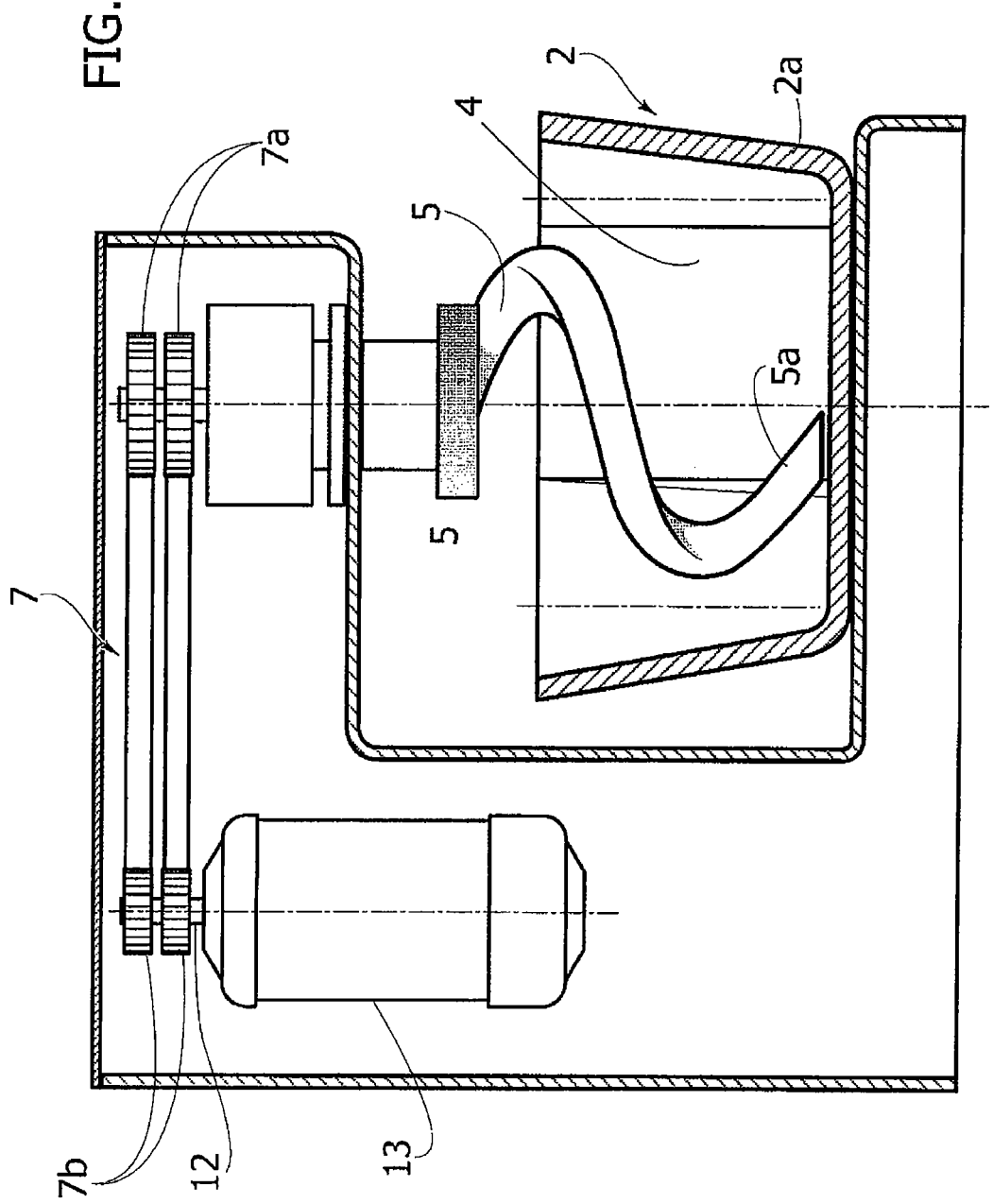
FIG. 12 is a cross-sectional side view of the machine of FIG. 10.

Alternatively, as illustrated in FIG. 5, the kneading machine according to the invention can envisage a supporting structure 14 comprising a head part 14a, mounted on which are the aforesaid actuation means 7, the kneading implements 5, and the motor 13, which is translatable with respect to a base portion 14b on respective guides (not illustrated) provided therein, through the actuation of a hydraulic linear actuator 15. In this embodiment of the kneading machine according to the invention, during the step of working of the dough the head part 14a is in a lowered position such that the kneading implements 5 rotate within the tank 2, and in a subsequent step of discharging of the dough the head part 14a is raised in order to enable the fixed tank 2 to be moved via a carriage 16, on which it is mounted for carrying out discharging of the dough in a purposely designed and equipped area.

Figure 13:
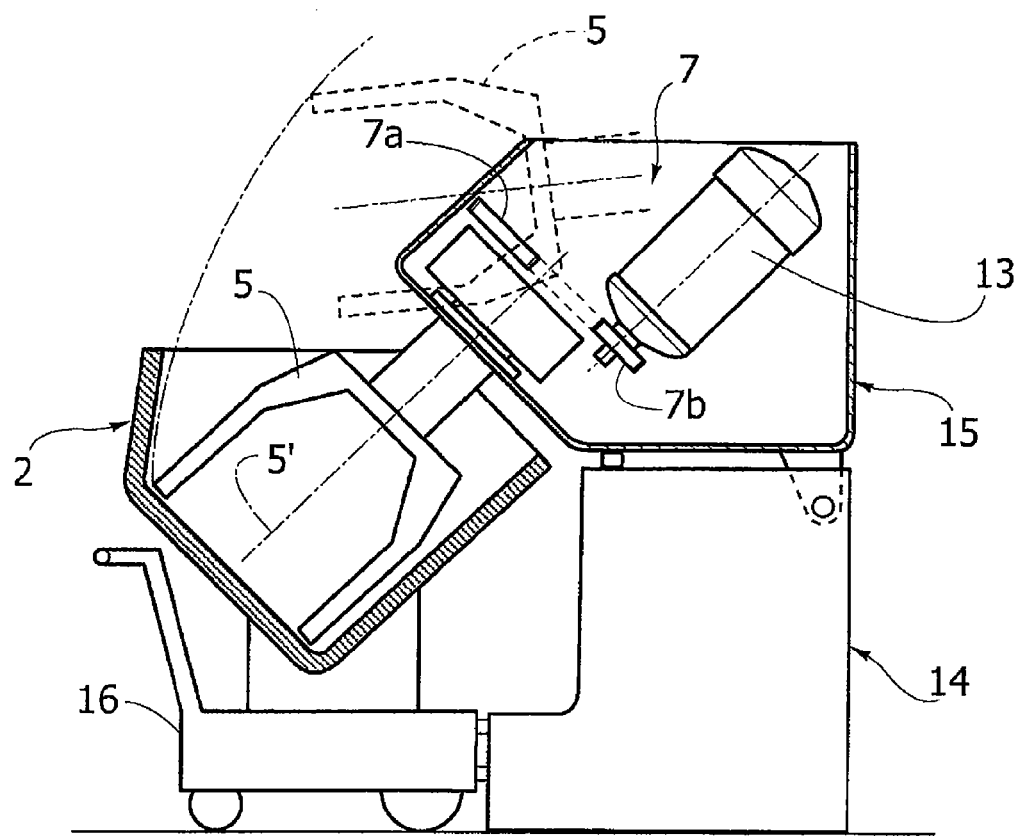
FIG. 13 is a cross-sectional side view of a further embodiment of the machine according to the invention.
Figure 14:
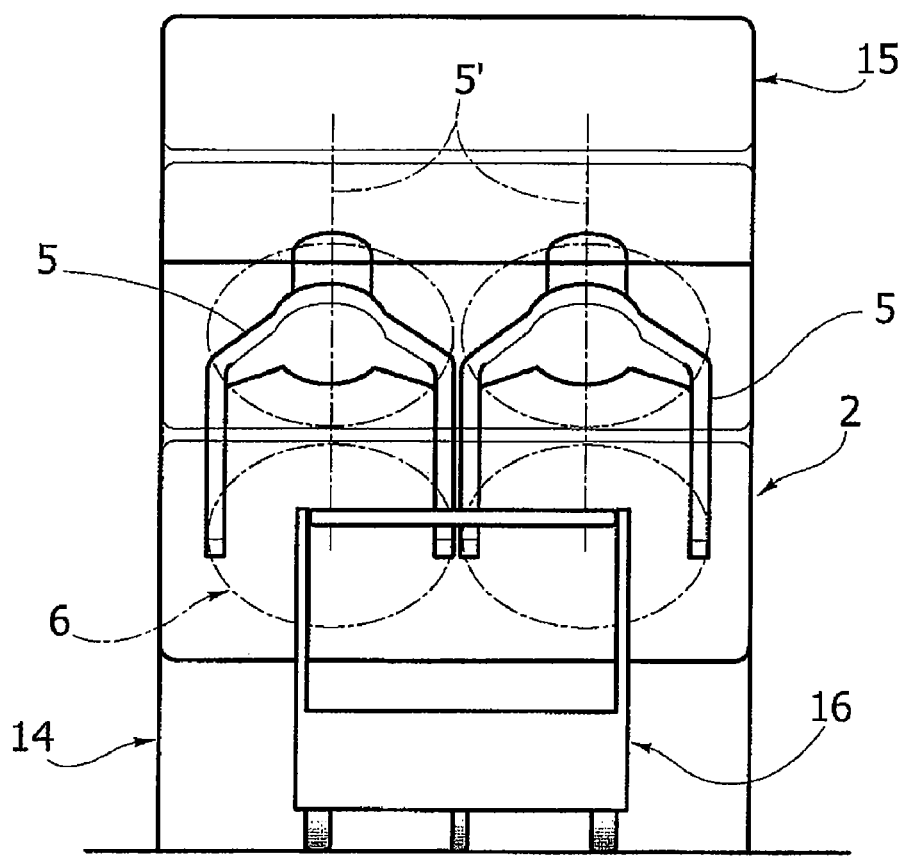
FIG. 14 is a front view of the machine of FIG. 13.

Illustrated in FIGS. 13 and 14 is a kneading machine according to the invention that has kneading implements 5 of the forklike type with inclined axis. The machine according to the invention has in this case a structure comprising a head part 14a that is rotatable with respect to the base part 14b in such a way that, in a discharge step, the head part 14a is rotated (in a clockwise direction as viewed FIG. 13) for extracting the kneading implements 5 from the tank 2 so that the latter is free to be moved via the carriage 16 on which it is mounted.

FIGS. 6 to 11 and FIG. 15 show further embodiments of the machine according to the invention in which the fixed tank 2 comprises a passage 3 that is made in a wall thereof and associated to which are means for adjustment of the width of the passage itself.

In particular in FIGS. 6 to 11, the passage 3 is provided in an area corresponding to the peripheral wall 2a, on a longitudinal end of the tank 2. Provided in a position corresponding to the passage 3 is a mobile wall 4, which can be actuated according to a roller-shutter movement. Hydraulic control members 11 are designed to actuate the movement of the mobile wall 4, and control means (not illustrated) are provided for controlling operation thereof. Furthermore, as may be seen in FIGS. 7 and 10, a conduit 9 is provided for introduction of the ingredients that will form the dough.

Present at one edge of the peripheral wall 2a delimiting the passage 3 is a conveying member 8. The conveying member 8 comprises a projecting distal end with a sharp edge 8b that extends tangentially to the theoretical cylinder of revolution adjacent thereto. In operation, the kneading implement 5 adjacent to the conveyor element 8 has a direction of rotation such that the sharp edge 5b of the kneading implement 5 is brought towards the conveying member 8 coming from the part the end 8b of the latter projects thereinto.

The mobile wall 4 can be actuated via the aforesaid control means (not illustrated) so as to vary the width of the passage 3. The passage 3 constitutes an outlet for the dough so that the mobile wall 4 can be actuated so as to vary the flow of dough coming out of the machine.

According to a preferred mode of operation, during working of the dough by the kneading implements 5, the mobile wall 4 is in a lowered position that closes the passage 3 completely. Ingredients that will be forming the dough are then introduced into the tank 2, through the conduit 9, the, and the two kneading implements 5 act simultaneously on the dough so as to exert a highly efficient kneading action. As already mentioned previously, the kneading implements 5 of the type illustrated in FIGS. 1 to 9 exert on the dough a synergistic shearing action in the area of tangency of the respective theoretical cylinders of revolution. Once the step of working of the dough is completed, the mobile wall 4 is brought into a raised position so as to open the passage 3 at least partially and enable the kneaded dough to come out. The conveying member 8, provided in the embodiment described herein, acts so as to intercept and free the dough from the kneading implement 5 adjacent thereto, to send it out of the tank 2. The conveying means 8 is therefore able to speed up the discharge of the dough from the fixed tank 2.

A further mode of operation of the kneading machine envisages, instead, that, during the step of working of the dough performed by the kneading implements 5, the mobile wall 4 is kept in a raised position so as to generate a continuous flow of kneaded product coming out of the machine through the passage 3. The mobile wall 4 can be actuated so as to adjust the outflow of the kneaded product and is likewise designed to determine the time of kneading to which the dough is coherently subjected.

Figure 15:
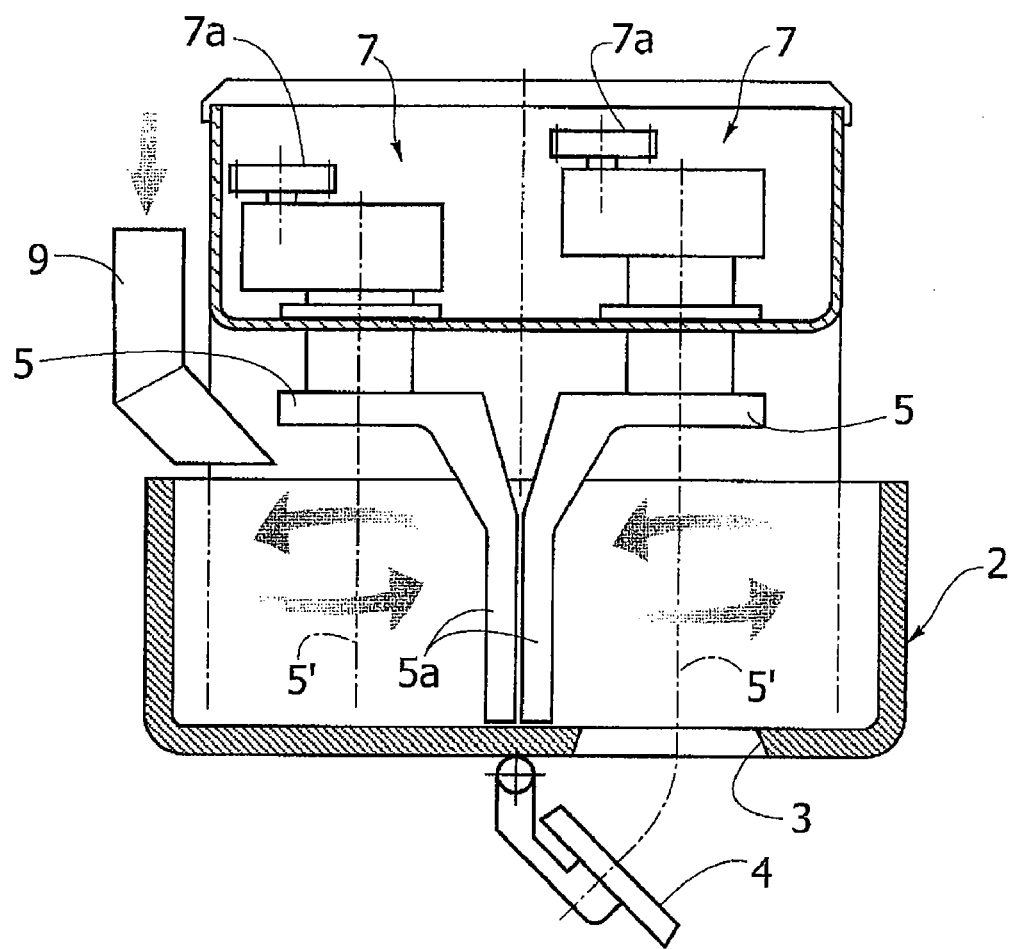
FIG. 15 is a front cross-sectional view of a further embodiment of the machine according to the invention.

FIG. 15 illustrates an embodiment of the machine according to the invention, in which the passage 3 is made on the bottom of the tank 2. In this case, the means for adjustment of the passage 3 are constituted by a hinged plug or hatch 4, which can turn in the plane of the figure and is set underneath the tank 2. The hatch 4 can be moved between a first position, in which it closes the passage 3, and a second position, in which the passage 3 is open and at the same time the hatch 4 acts so as to deflect the flow of dough coming out in an appropriate direction. In the operation of the embodiment illustrated in FIG. 15, it is preferable to provide a control of the hatch 4, in which, during working of the dough within the tank 2, the hatch 4 is in the aforesaid first position and subsequently is activated to move into the second position in order to cause the dough to come out by the force of gravity.

A preferred embodiment of the invention envisages associating to the fixed tank 2 means that control the temperature and/or the pressure within the tank. It is in fact possible to envisage a fixed tank 2 having double walls, in which a space is provided for circulation of a diathermic fluid for controlling the temperature within the tank. Furthermore, there can be provided means for air-tight closing of the tank in order to enable any pressure to be set up therein. Since the kneading machine according to the invention is equipped with a fixed tank, the aforesaid means designed to control the environment of the dough within the tank can be easily prearranged on the structure of the tank itself, without this implying any particularly burdensome structural complication of the machine.

Of course the details of construction and the embodiments of the invention may vary widely with respect to what is described and illustrated herein, without thereby departing from the scope of the present invention, as defined in the ensuing claims.

What is claimed is:

1. A machine for the production of dough mixes for foodstuffs, comprising:
   a fixed tank and two kneading implements with fixed axes of rotation oriented parallel to a first direction and aligned with each other along a second direction substantially orthogonal to said first direction, wherein said two kneading implements define respective theoretical volumes of revolution;
   said tank comprising two longitudinal peripheral walls opposed to each other, which run substantially parallel to said second direction and are connected to each other at their own ends by two curved peripheral walls opposed to each other, wherein at least one of the longitudinal peripheral walls of said tank diverges upwards starting from the bottom of the tank;

said two kneading implements, for a part of their length being substantially rectilinear and each extending in a direction substantially parallel or inclined by an angle not substantially greater than 10° with respect to a generatrix of a theoretical cylinder of revolution coaxial to the axis of rotation of the kneading implement.

2. The machine according to claim 1, wherein said fixed tank comprises a passage made in a wall thereof, associated to which are means for adjustment of said passage.

3. The machine according to claim 2, wherein said passage is made in a peripheral wall of said fixed tank.

4. The machine according to claim 2, wherein said passage is made in a bottom wall of said fixed tank.

5. The machine according to claim 1, wherein said fixed tank is associated to a conduit for introducing ingredients of dough.

6. The machine according to claim 2, wherein said means for adjustment of said passage comprise a mobile portion of wall of said fixed tank.

7. The machine according to claim 2, wherein said mobile portion of wall can be actuated according to a roller-shutter movement.

8. The machine according to claim 2, wherein said fixed tank comprises conveying member designed to direct dough through said passage.

9. The machine according to claim 8, wherein said conveying means comprise a fixed member set in the vicinity of said passage in such a way as to intercept the dough worked by said two kneading implements and direct the dough outside of said fixed tank.

10. The machine according to claim 4, wherein said means for adjustment of said passage comprise a hinged plug or hatch.

11. The machine according to claim 1, wherein said at least one of the longitudinal peripheral walls is inclined with respect to the vertical, preferably by an angle P comprised between approximately 0° and 45°.

12. The machine according to claim 1, wherein said two kneading implements are prearranged to create an action of squeezing and stretching of the dough against at least one of said peripheral walls.

13. The machine according to claim 1, wherein said fixed tank is associated to means for introducing the ingredients of the dough.

14. The machine according to claim 1, wherein said fixed tank has double walls, in which a space is provided for circulation of a fluid for control of the temperature within the chamber.

15. The machine according to claim 1, wherein said fixed tank is hermetically closed in order to be able to work in conditions of modified atmosphere.

16. The machine according to claim 1, wherein the rotation of said kneading implements for an angular interval of at least 90°, the distance of said implements from said curved peripheral walls decreases along the direction of said rotation, so as to create an action of squeezing and stretching of the dough against said curved peripheral walls.

17. The machine according to claim 1, wherein one of said longitudinal peripheral walls diverges, whereas the other longitudinal peripheral wall is vertical.

18. A machine for the production of dough mixes for foodstuffs, comprising:

a fixed tank and two kneading implements with fixed axes of rotation oriented parallel to a first direction and aligned with each other along a second direction substantially orthogonal to said first direction, wherein said two kneading implements define respective theoretical volumes of revolution;

said tank comprising two longitudinal peripheral walls opposed to each other, which run substantially parallel to said second direction and are connected to each other at their own ends by two curved peripheral walls opposed to each other, wherein a first wall of the longitudinal peripheral walls of said tank diverges upwards starting from the bottom of the tank and a second wall of the longitudinal peripheral walls of said tank is vertical;

said at least two kneading implements, for a part of their length being substantially rectilinear and each extending in a direction substantially parallel or inclined by an angle not substantially greater than 10° with respect to a generatrix of a theoretical cylinder of revolution coaxial to the axis of rotation of the kneading implement.

* * * * *